US006533599B1

(12) United States Patent
Singleton, Jr.

(10) Patent No.: US 6,533,599 B1
(45) Date of Patent: Mar. 18, 2003

(54) SELF-ALIGNING INFORMATION PROCESSING DEVICE DOCKING APPARATUS AND METHOD OF USE THEREFOR

(75) Inventor: Charles W. Singleton, Jr., Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 10/020,792

(22) Filed: Oct. 30, 2001

(51) Int. Cl.$^7$ .............................................. H01R 13/625
(52) U.S. Cl. ........................ 439/347; 361/727; 361/683
(58) Field of Search ................................. 439/157, 310, 439/341, 347, 953; 361/685, 724–727, 683

(56) References Cited

U.S. PATENT DOCUMENTS 6,220,883 B1   4/2001   Helot et al.
6,264,488 B1   7/2001   Helot et al.

*Primary Examiner*—Tho D. Ta
*Assistant Examiner*—L. Tsukerman

(57) ABSTRACT

A docking apparatus includes a pair of engagement members, at least one of which is movable relative to the other. The docking apparatus may be used in, and/or form part of, systems and methods that dock an information processing device to the docking apparatus.

39 Claims, 6 Drawing Sheets

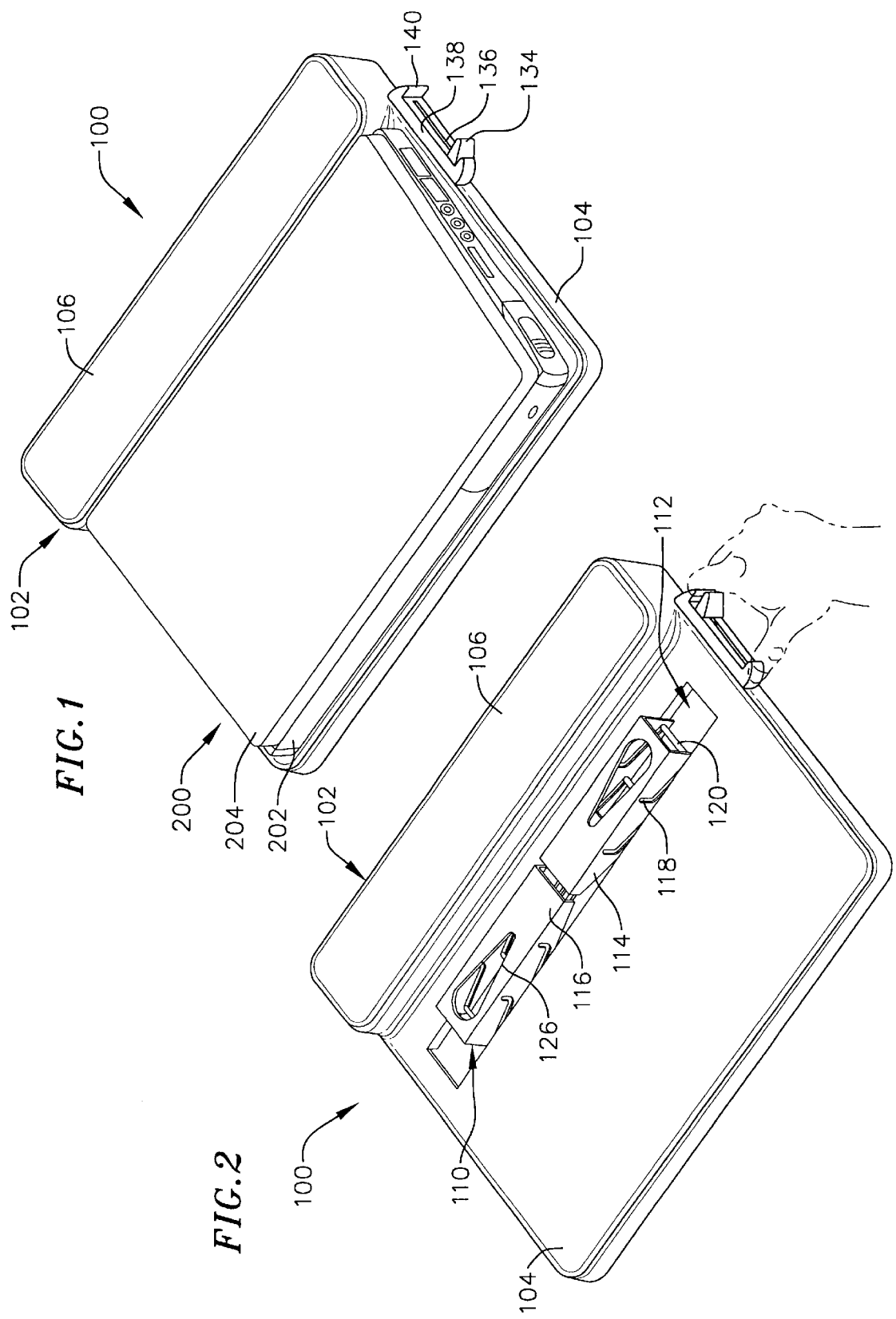

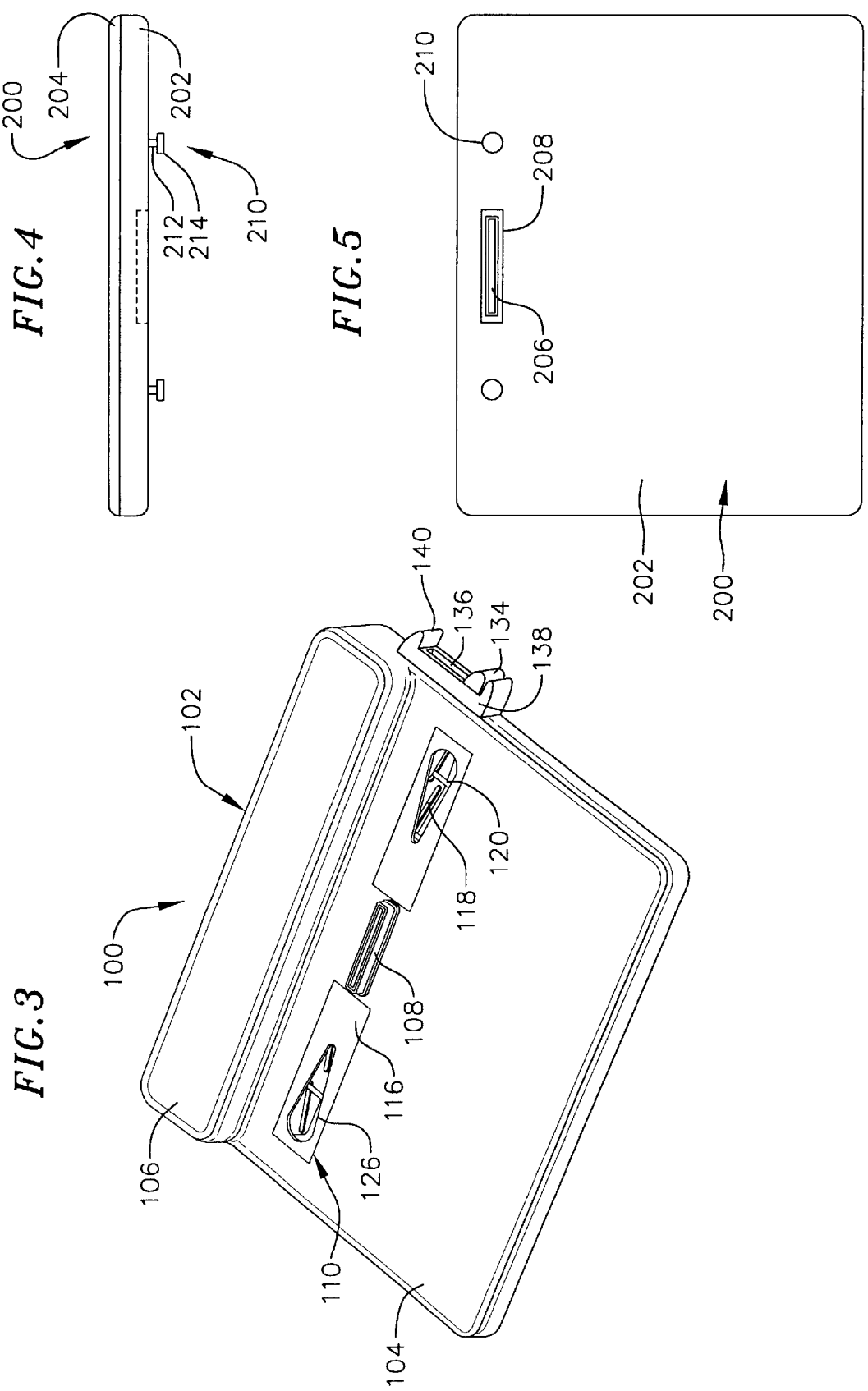

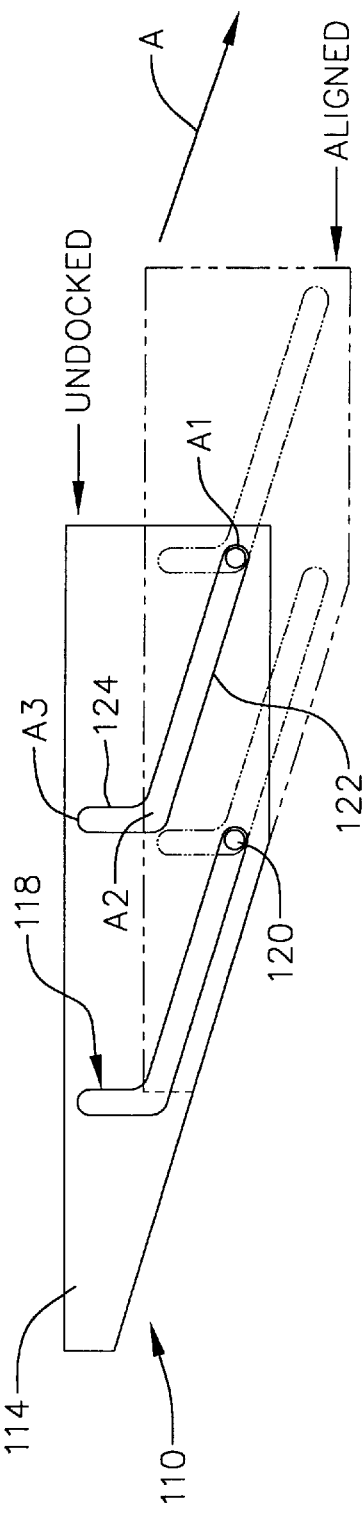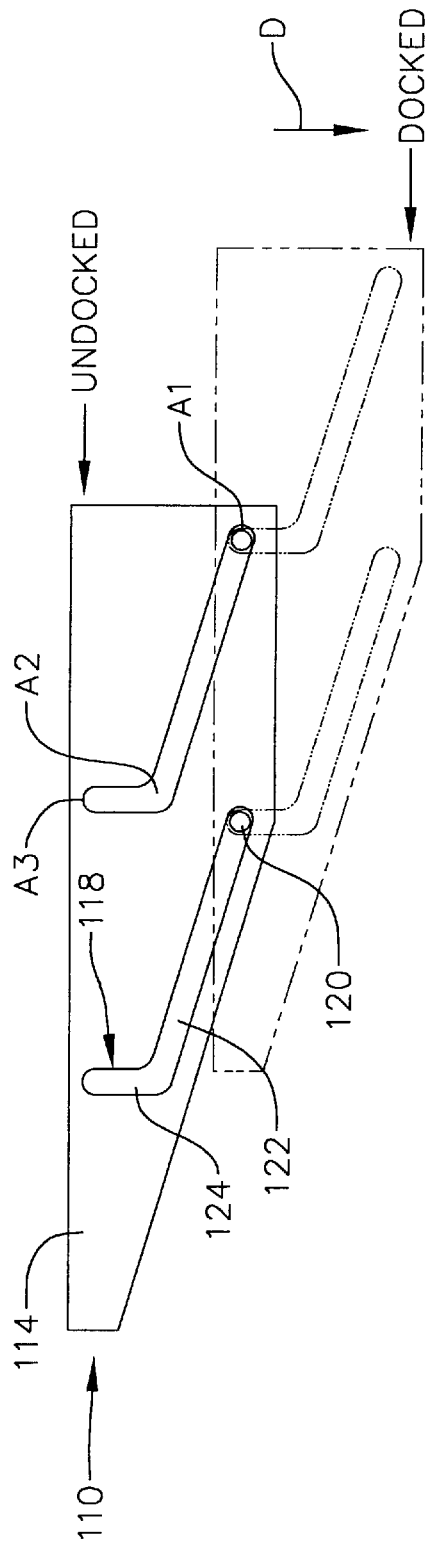

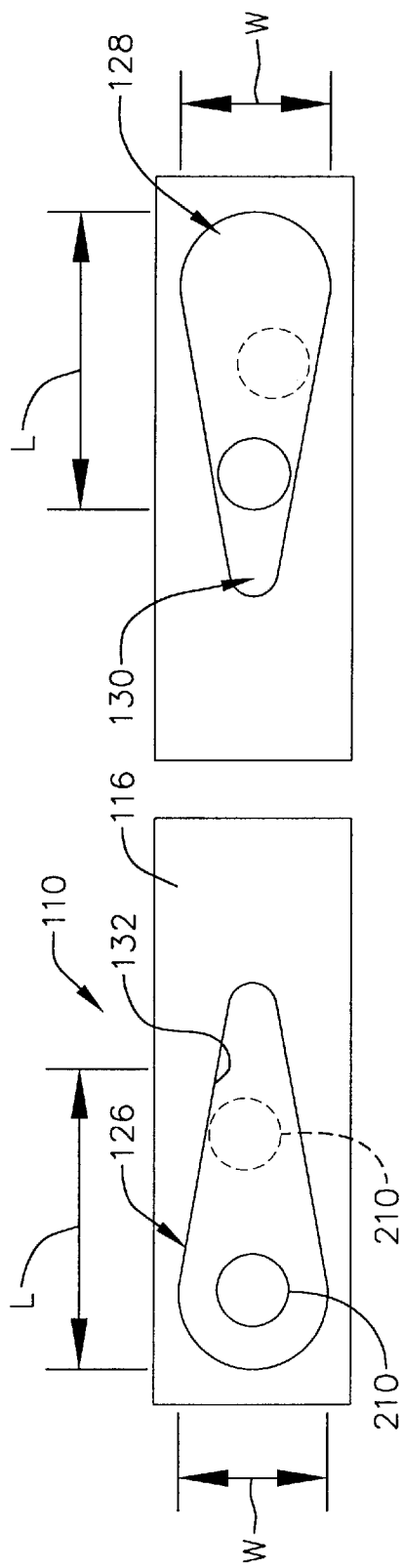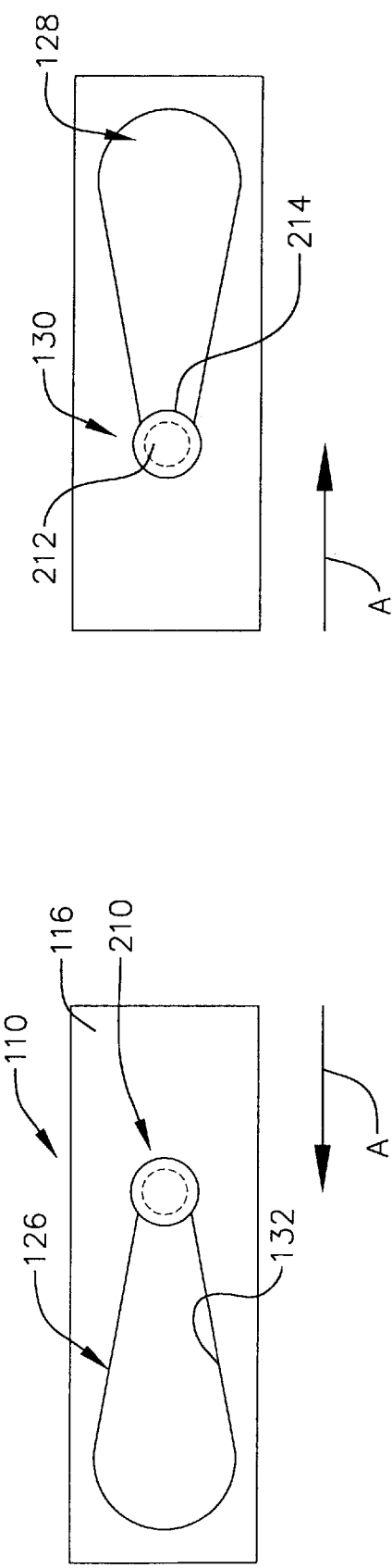

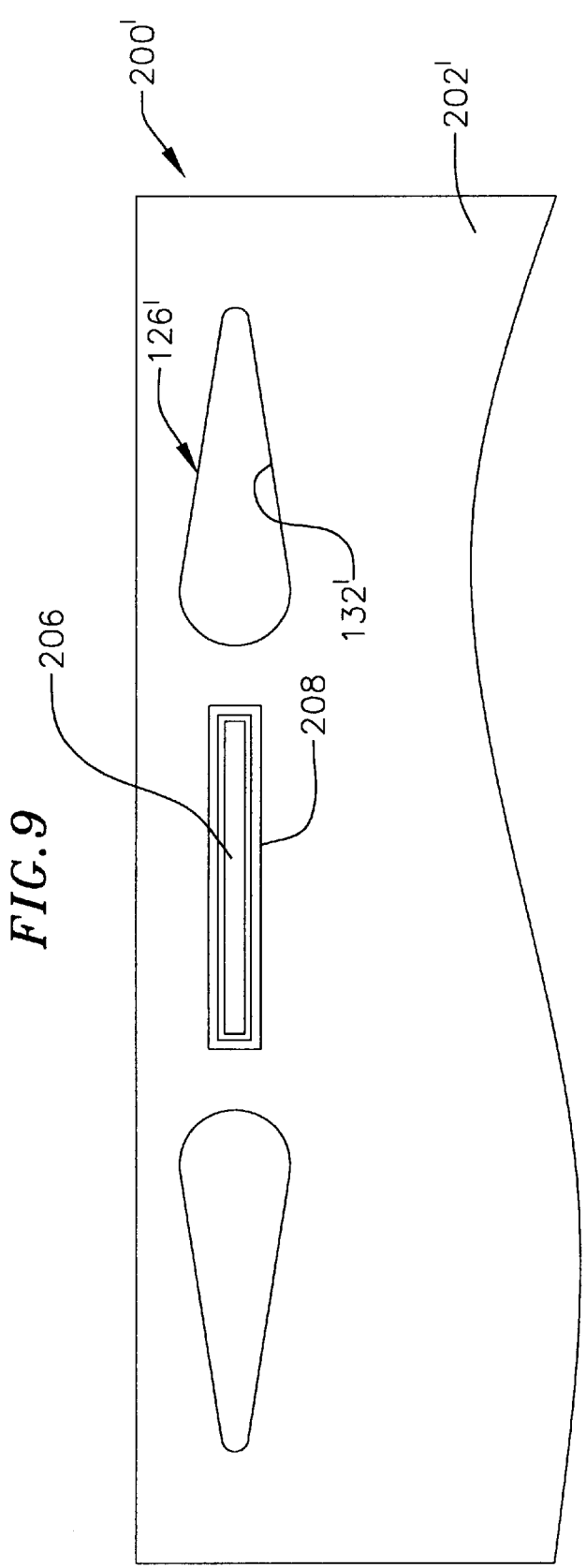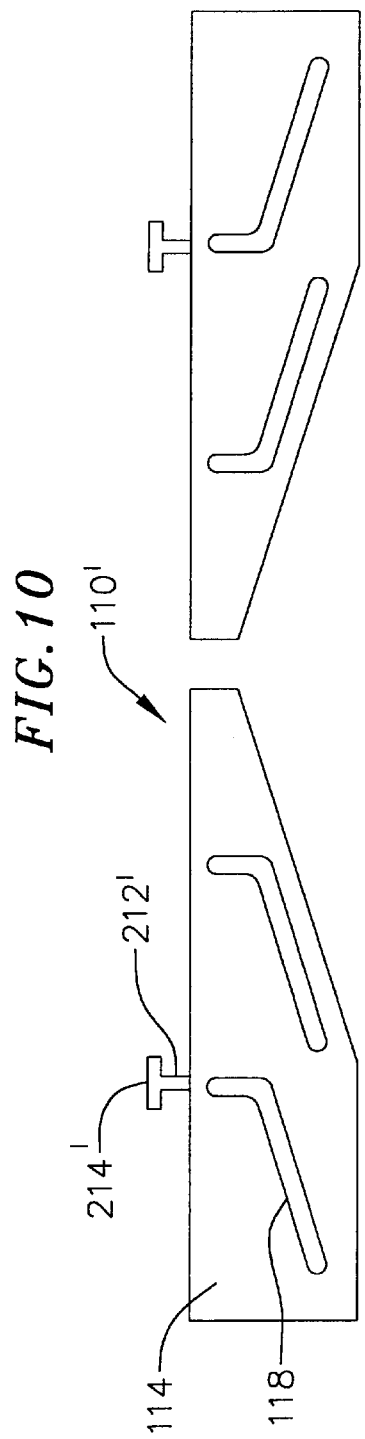

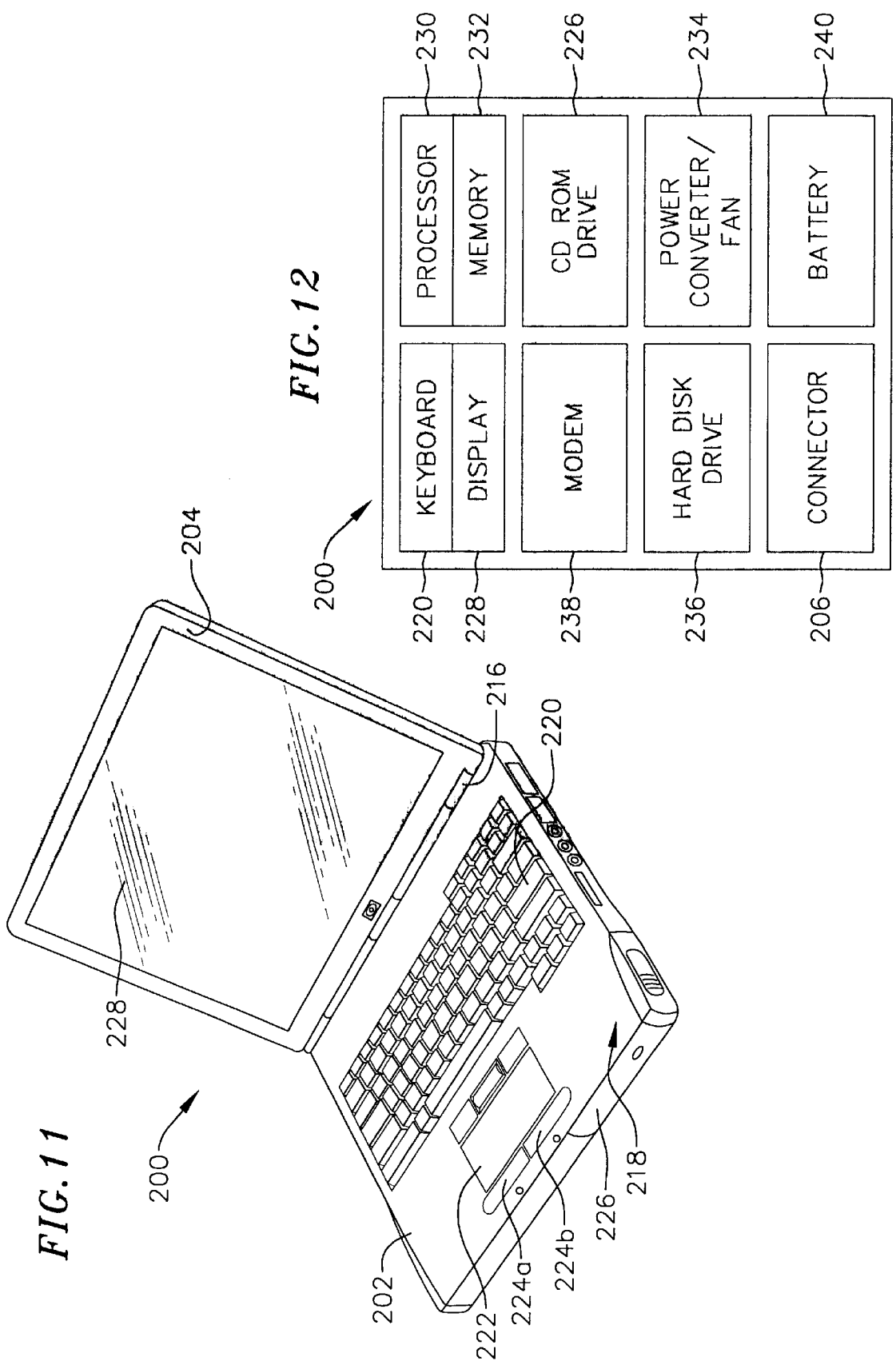

US 6,533,599 B1

SELF-ALIGNING INFORMATION PROCESSING DEVICE DOCKING APPARATUS AND METHOD OF USE THEREFOR

BACKGROUND OF THE INVENTIONS

The present inventions are related to portable information processing devices and, more specifically, to docking apparatus for use with portable information processing devices.

A wide variety of portable information processing devices have been introduced over the years. Notebook computers such as the Hewlett-Packard Omnibook 6000 notebook PC, handheld PCs such as the Hewlett-Packard Jornada 7000 handheld PC, and palmtop PCs (also referred to as "pocket PCs") such as the Hewlett-Packard Jornada 520 palmtop PC are well-known examples of portable information processing devices. Recently, information processing capabilities have been incorporated into other portable devices including, but not limited to, personal digital assistants, wireless e-mail devices, mobile phones, electronic payment devices, digital cameras, and electronic games. Such devices, and other portable devices with information processing capabilities, are collectively referred to herein as "portable information processing devices."

Portable information processing devices are frequently connected, both mechanically and electrically, to other devices. Notebook computers, for example, typically include keyboards and displays that are smaller than those used in conjunction with desktop computers. In order to provide users with a desktop-like experience, docking stations have been introduced in order to allow a notebook computer to be readily connected to a full-size keyboard, desk top display monitor, printer, mouse, network, etc. It is important that the electrical connectors on the notebook computer and docking station be properly aligned prior to connection to prevent connector damage. Aligning the electrical connectors manually can, however, be difficult. This is especially true in low visibility situations such as when the docking station is located beneath a monitor stand. To that end, some docking stations and notebook computers include a guide system, which typically consists of guide rails on the docking station that cooperate with corresponding slots on the bottom or sides of the notebook computer, to ensure that the electrical connectors are properly aligned with one another prior to connection.

Users of handheld and palmtop PCs have similarly benefited from the introduction of docking cradles. The docking cradles may be connected to, or incorporated into, modem devices and standard sized keyboards. Docking cradles have also been introduced for personal digital assistants, wireless e-mail devices, mobile phones, electronic payment devices, and digital cameras in order to allow these devices to, for example, be connected to the serial or USB port of a PC for data transfer and information synchronization purposes. Docking stations, docking cradles, and the like are collectively referred to herein as "docking apparatus."

The inventor herein has determined that conventional docking equipment are susceptible to improvement. For example, the inventor herein has determined that the guide rails and slots can be difficult to align. The inventor herein has also determined that the guide rail and slot arrangement is somewhat inflexible because, in those instances where the slots are located on the side of the portable information processing device, the information processing devices used with a particular docking apparatus must have the same width. Moreover, whether on the bottom or on the sides, the slots arrangement can dictate a less than optimal arrangement of the components within information processing device housing. Additionally, docking stations that connect vertically often have locking hooks, with vertically facing cam surfaces, that must be urged out of the way during the docking process. This adds to the level of force that the user must apply during docking.

SUMMARY OF THE INVENTIONS

A docking apparatus in accordance with a preferred embodiment of a present invention includes a pair of engagement members, at least one of which is movable relative to the other. The docking apparatus may be used in, and/or form part of, systems and methods that dock an information processing device to a docking apparatus.

In one implementation, movement of at least one engagement member relative to the other cause initially misaligned docking apparatus and information processing device electrical connectors to become aligned with one another so that they can be subsequently connected. As a result, the present inventions do not require that the users precisely align the information processing device prior to docking. The present inventions also avoid the design limitations associated with the aforementioned rail and slot arrangements. The present inventions also facilitate one-handed docking and do not require the user to apply the additional force associated with some conventional docking apparatus.

BRIEF DESCRIPTION OF THE DRAWINGS

Detailed description of preferred embodiments of the inventions will be made with reference to the accompanying drawings. Certain aspects of the preferred embodiments have been eliminated from some or all of the views for clarity.

FIG. 1 is a perspective view of a docking apparatus and portable information processing device system in accordance with a preferred embodiment of a present invention.

FIG. 2 is a perspective view of a docking apparatus in accordance with a preferred embodiment of a present invention in an undocked orientation.

FIG. 3 is a perspective view of the docking apparatus illustrated in FIG. 2 in a docked orientation.

FIG. 4 is an end view of a portable information processing device in accordance with a preferred embodiment of the present invention.

FIG. 5 is a bottom view of the portable information processing device illustrated in FIG. 4.

FIGS. 6A and 6B are side views of a docking apparatus engagement member in accordance with a preferred embodiment of a present invention.

FIG. 7 is a bottom view of a pair of docking apparatus engagement members in accordance with a preferred embodiment of a present invention in their undocked positions.

FIG. 8 is a bottom view of a pair of docking apparatus engagement members in accordance with a preferred embodiment of a present invention in their aligned positions.

FIG. 9 is a bottom view of a portable information processing device in accordance with a preferred embodiment of a present invention.

FIG. 10 is a side view of a pair of docking apparatus engagement members that may be used in conjunction with the portable information processing device illustrated in FIG. 9.

FIG. 11 is a perspective view of a portable computer in accordance with a preferred embodiment of a present invention.

FIG. 12 is a block diagram showing various operating components of the portable computer illustrated in FIG. 11.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. Additionally, it is noted that detailed discussions of various conventional operating components of computers and docking apparatus which are not pertinent to the present inventions have been omitted for the sake of simplicity.

As illustrated for example in FIG. 1, a system in accordance with one embodiment of a present invention includes a docking apparatus 100 and a portable information processing device 200. The exemplary docking apparatus 100 includes a housing 102 with a platform 104, which supports the docked information processing device 200, and a back panel 106, which supports a variety of connectors (not shown) that allow the docked device to interface with other devices. Although the present inventions are not limited to any particular information processing device, the exemplary portable information processing device 200 is a portable computer including a main housing 202 and a display housing 204. Accordingly, the aforementioned connectors on the docking apparatus back panel 106 would preferably include connectors that allow the portable computer 200 to interface with devices such as a full size keyboard, mouse, full size monitor, printer, and network. The structural and operating components of the exemplary portable computer 200 which are not particularly pertinent to its docking functions are discussed in detail below with reference to FIGS. 11 and 12.

Referring to FIGS. 3 and 5, the docking apparatus is also provided with a connector 108, such as the exemplary 240-pin PCI connector plug, which is adapted to mate with a corresponding 240-pin PCI connector receptacle 206 on the portable computer 200 or other information processing device. In the illustrated embodiment, the docking apparatus connector 108 extends outwardly from the platform 104, while the portable computer connector 206 is recessed within the main housing 202. The docking apparatus connector 108 passes through an opening 208 formed in the bottom surface of the main housing 202 to mate with the portable computer connector 206 during the docking process. Alternatively, the docking apparatus connector 108 could be located within the platform 104, while the portable computer connector 206 extends outwardly from the main housing 202 or, alternatively, the connectors could be generally in-plane with the platform and the main housing.

A pair of movable engagement members 110 may be carried by the docking apparatus housing 102. In the exemplary embodiment, the engagement members 110 are positioned within a pair of openings 112 (FIG. 2) on opposite sides of the connector 108 (FIG. 3). The engagement members 110 are movable between the undocked position illustrated in FIG. 2 and the docked position illustrated in FIG. 3 and are preferably, but not necessarily, similar in structure. The portable computer 200 includes a corresponding pair of engagement members 210 that are configured to cooperate with the docking apparatus engagement members 110 such that connectors 108 and 206 are aligned with, and connected to, one another as the engagement members move from the undocked position to the docked position.

In the exemplary embodiment illustrated in FIGS. 1–8, the docking apparatus engagement members 110 include a pair of side portions 114 and a top portion 116 (shown in detail in FIGS. 2 and 6A). The side portions 114 include slots 118 that ride on posts 120. Each slot includes a generally diagonal portion 122 and a generally vertical portion 124. Accordingly, the top portion 116 of the engagement members 110 moves both members away from one another, and towards the connector 108, as the engagement members move from the undocked position (FIGS. 2 and 7) to the docked position (FIGS. 3 and 8). As discussed in greater detail below, movement of engagement members 110 away from one another is referred to herein as the "alignment component" of the engagement member movement, while movement that causes the computer connector 206 to move towards the surface associated with the docking apparatus connector 108 (the top of the platform 104 in the illustrated embodiment) is referred to as the "connecting component."

The top portion 116 of each of the exemplary engagement members 110 includes an aperture 126 that receives one of the engagement members 210 on the portable computer 200 or other information processing device. Referring more specifically to FIGS. 7 and 8, the exemplary apertures 126 are asymmetrical about one axis and symmetrical about the other axis, and preferably include a relatively wide region 128 near one end and a relatively narrow region 130 near the other end. Although not limited to any particular configuration, the engagement members 210 in the exemplary embodiment illustrated in FIGS. 1–9 are T-shaped members that consist of a post 212 and a disc 214 as shown in FIG. 4. The specific dimensions of the engagement members 110 and 210 vary from application to application. In the illustrated embodiment, however, the width W of the relatively wide region 128, which represents a large user placement error front to back, is preferably about two to about three times the diameter of the disk 214, while the width W of the relatively narrow region is preferably about the same as the post 212. The length L, which represents the side to side user placement error, is preferably about 40 mm to about 80 mm. The length of each post 212 should be slightly longer than the thickness of associated engagement member top portion 116.

The configuration of the apertures 126 is preferably such that the user does not have to perfectly align the connector 108 and 206 when placing the portable computer 200 or other information processing device onto the exemplary docking apparatus 100. The docking process preferably begins with the docking apparatus docking members 110 in the undocked position illustrated in FIGS. 2 and 7. Additionally, as illustrated in FIG. 6A, the posts 120 are initially aligned with point A1 on the generally diagonal portion 122 of the slots 118. Placement of the portable computer 200 on the docking apparatus 100 by the user such that the engagement members 210 are positioned within the apertures 126 in, for example, the solid or dash line positions shown in FIG. 7 result in the connectors 108 and 206 being initially misaligned.

The posts 212 on the portable computer 200 are engaged at some point by the inner surfaces 132 as the docking apparatus engagement members 110 move from the position illustrated in FIG. 7 to the position illustrated in FIG. 8. The shape of the slots 118 (FIGS. 6A and 6B) cause the docking members 110 to initially move in the direction of arrows A in FIGS. 6A and 8. The travel of the docking apparatus engagement members 110, the shape of the apertures 126, the size and position of the relatively narrow regions 130, and the position of the portable computer engagement members 210 together cause the portable computer engagement members to be moved to the positions shown in FIG. 8 when the docking apparatus engagement members reach the positions shown in dash lines in FIG. 6A.

When positioned according to FIG. 8, the connector 206 on the portable computer 200 is aligned, both front to back and side to side, with the connector 108 in the docking apparatus 100, just as it would be if the connector 206 had initially been perfectly aligned. The horizontal component of the movement (in the exemplary orientation) of docking members 110 in the direction of arrow A is, therefore, considered the alignment component. Although there is a slight vertical component to movement in the direction of arrow A in the exemplary embodiment, the connectors 108 and 206 are spaced apart when portable computer engagement members 110 reach the position shown in FIGS. 6A (dash lines) and 8. The alignment component is preferably, but not necessarily, lateral relative to the surface associated with the docking apparatus connector 108 (the top of the platform 104 in the illustrated embodiment).

When the engagement members 110 reach the position shown in FIGS. 6A (dash lines) and 8, the posts 120 are aligned with point A2 on the generally diagonal portion 122 of slots 118 and, accordingly, are aligned with the generally vertical portion 124 of the slots. The engagement members 110 and 210 are also mechanically interconnected because the diameter of the disks 214 is greater than the width of the relatively narrow regions 130. Accordingly, as the engagement members 110 move in the direction of arrow D from the dash line position illustrated in FIG. 6A to the dash line position illustrated in FIG. 6B, the portable computer 200 is pulled towards the platform 104 by the engagement members 210 until the posts 120 reach point A3 on the generally vertical portion 124 of the slots 118. This is also the position illustrated in FIGS. 1 and 3, where the computer connector 206 mates with the docking apparatus connector 108.

Movement of the docking members 110 in the direction of arrow D is, therefore, considered the connecting component of their movement. As noted above, the connecting component of movement preferably includes any movement towards the surface associated with the docking apparatus connector 108 (the top of the platform 104 in the illustrated embodiment). Preferably, but not necessarily, this movement is perpendicular to the surface.

It should be noted that, in addition to providing mechanically assisted alignment, the present engagement members arrangement (as well as those described below) allow a variety of differently sized and shaped information processing devices to be used with the same docking apparatus so long as each information processing device has a common electrical connector and engagement member arrangement.

In the exemplary embodiment illustrated in FIGS. 1–8, a slidable handle 134 (of FIG. 2) allows the user to drive the docking apparatus docking members 110 to and from the positions illustrated in FIGS. 2 and 3. The handle 134 slides within a slot 136 in a handle base 138. Tabs 140 are positioned at the longitudinal ends of the slot 136 to facilitate use of the handle 134. Any suitable mechanical linkage may be used to link the handle 134 to the docking members 110. The handle 134, which moves horizontally, may be replaced by a handle that pivots vertically or a depressible button. Two handles, each individually connected to a respective docking member, may also be provided.

As noted above, the present inventions are not limited to any particular information processing device. Information processing devices that may form part of, or be used in combination with, the present invention include but are not limited to notebook PCs, handheld PCs, palmtop PCs, personal digital assistants, wireless e-mail devices, mobile phones, electronic payment devices, digital cameras, and electronic games. Nevertheless, for illustrative purposes, a portable computer is shown.

The exemplary portable computer 200 is, with respect to many of the structural and operating components, substantially similar to conventional portable computers such as the Hewlett-Packard Omnibook 6000 notebook PC. Referring more specifically to FIGS. 11 and 12, the exemplary portable computer 200 includes structural components such as the main housing 202 and display housing 204 which are pivotably by a hinge 216. The top side of the main housing 202 includes a user interface 218 that allows the user to control the computer. In the exemplary embodiment, the user interface 218 consists of a keyboard 220, a touch pad 222, and pair of right/left click buttons 224a/224b. Each of these elements operates in conventional fashion to control the operations of the computer 200 and application programs running thereon. The main housing 202 also includes a module bay for optional modules such as the illustrated CD-ROM drive module 226, a 3.5 inch disk drive module, or a ZIP drive module. A battery bay (not shown) may be provided. In addition to supporting a display 228, the display housing 204 also acts as a lid to cover the user interface 218 when in the closed position. To that end, a conventional latch arrangement (not shown) may be provided to lock the free end of the display housing 204 to the main housing 202 and maintain the display housing in the closed position.

The operating components of the exemplary computer 200 include a CPU (or "processor") 230, cache and RAM memory 232, a power adapter and fan arrangement 234, a hard disk drive 236, a modem 238, a battery 240 positioned within the battery bay, and the connector 206. The exemplary portable computer 200 may also include other conventional components such as, for example, audio and video cards, headphone and microphone ports, serial, parallel and USB ports, keyboard and mouse ports, an operating system such as Microsoft® Windows, and various application programs such a word processing, spreadsheets, security programs and games.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

By way of example, and not limitation, and turning to FIGS. 9 and 10, in an exemplary docking apparatus and information processing device system that is otherwise similar to that described above with reference to FIGS. 1–8, the housing 202' of the portable computer or other information processing device 200' includes a pair of apertures 126' which serve as the docking members on the portable computer. The docking apparatus, on the other hand, includes a pair of movable engagement members 110' which respectively support a pair of T-shaped members that consist of a post 212' and a disk 214'. The posts 212' engage the inner surfaces 132' of the portable computer apertures 126' as the docking apparatus engagement members 110' move from the undocked positions (FIGS. 6A and 7) to the aligned positions (FIGS. 6A and 8). In addition to aligning the connectors 108 and 206 in the manner described above, the disks 214' engage the inner surface of the housing 202' to mechanically interconnect the docking apparatus and portable computer. Thus, when the engagement members move from aligned position (FIG. 6A) to docked position (FIG. 6B), the connectors 108 and 206 are mate.

The locations of the connectors 108 and 206 and engagement members 110 and 210 may also be varied as desired or to suit particular applications. The exemplary systems described above with reference to FIGS. 1–10 may, for example, be reconfigured such that the engagement members 110 are moved to the vertically extending surface of the docking apparatus back panel 106 and the engagement members 210 moved to the rear surface of the portable computer 200. As such, the portable computer is pulled back against the back panel 106 instead of down against the platform 104.

The movement of the engagement members 110 and 210 may also be varied as desired or to suit particular applications. The exemplary systems described above with reference to FIGS. 1–10 may, for example, be reconfigured such that only one of the engagement members 110 moves during the docking process. The exemplary systems described above with reference to FIGS. 1–10 may also be reconfigured such the generally diagonal portions 122 of the slots 118 extend horizontally and the only connecting component of movement is provided by the generally vertical portions 124. Alternatively, for some connectors, the generally vertical portions 124 of the slots 118 may be eliminated. Here, the aligning and connecting components of movement is provided solely by the generally diagonal portions 122. The shapes of the slots 118 may also be arcuate and/or the respective lengths of the slots may vary from slot to slot. The engagement members 110 movement may also be controlled with mechanisms other than the exemplary post and slot arrangement such as a multi-bar mechanical linkage that moves the engagement members over the desired course of travel. Additionally, pins which extend outwardly from the engagement member side portions 114 may ride in corresponding slots within the housing 102.

The overall shape and size of the docking apparatus may also be varied as desired or to suit particular applications. The exemplary systems described above with reference to FIGS. 1–10 may, for example, be reconfigured such that the length of the docking apparatus tray 104 (measured from the front edge to the back panel 106) is reduced and the apparatus tray and engagement members 110 are angled relative to the surface on which the docking apparatus is placed. Here, portable computer 200 or other information processing device is at an angle relative to the surface when docked and the front edge of the portable computer rests on the surface.

What is claimed is:

1. A docking apparatus, comprising:
    a base member having a base member docking surface; and
    first and second engagement members movable relative to the base member docking surface between respective undock positions and dock positions; wherein
        the movement of the first and second engagement members between the respective undock positions and dock positions includes an alignment component that results in the first and second engagement members moving in different directions relative to the docking surface and a connecting component that results in the first and second engagement members moving in substantially the same direction relative to the docking surface.

2. A docking apparatus as claimed in claim 1, further comprising:
    an electrical connector associated with the docking surface.

3. A docking apparatus as claimed in claim 2, wherein the electrical connector extends outwardly from the docking surface.

4. A docking apparatus as claimed in claim 1, further comprising:
    an actuatable device associated with the base member and operably connected to the first and second engagement members such that the first and second engagement members move in response to movement of the actuatable device.

5. A docking apparatus as claimed in claim 1, wherein the first and second engagement members include respective engagement member docking surfaces that define respective docking apertures.

6. A docking apparatus as claimed in claim 5, wherein at least one of the engagement member docking apertures is asymmetrically shaped.

7. A docking apparatus as claimed in 5, wherein at least one of the engagement member docking apertures is relatively wide near one longitudinal end and relatively narrow near another longitudinal end.

8. A docking apparatus as claimed in claim 1, wherein the first and second engagement members include respective engagement member docking posts.

9. A docking apparatus as claimed in claim 1, wherein the alignment component results in the first and second engagement members moving away from one another.

10. A docking apparatus as claimed in claim 1, wherein the connecting component results in the first and second engagement members moving toward the docking surface.

11. A system, comprising:
    a portable information processing device including
        an information processing device electrical connector, and
        first and second information processing device engagement members; and
    a docking apparatus including
        a base member having a base member docking surface,
        a docking apparatus electrical connector associated with the base member docking surface, and
        first and second docking apparatus engagement members movable relative to the base member docking surface between respective undock positions where the electrical connectors are disconnected and dock positions where the electrical connectors are connected,
        the movement of the first and second docking apparatus engagement members between the respective undock positions and dock positions including an alignment and a connecting component.

12. A system as claimed in claim 11, wherein the docking apparatus electrical connector extends outwardly from the docking surface and the information processing device electrical connector is located within the information processing device.

13. A system as claimed in claim 11, further comprising:
    an actuatable device associated with the docking apparatus base member and operably connected to the first and second docking apparatus engagement members such that the docking apparatus first and second engagement members move in response to movement of the actuatable device.

14. A system as claimed in claim 11, wherein the first and second docking apparatus engagement members include respective engagement member docking surfaces defining docking apertures and the first and second information processing device engagement members are configured and positioned to be received by the docking apertures.

15. A system as claimed in claim 14, wherein at least one of the engagement member docking apertures is asymmetrically shaped.

16. A system as claimed in claim 14, wherein the first and second information processing device engagement members include respective docking posts.

17. A system as claimed in claim 11, wherein the first and second information processing device engagement members together comprise at least one docking aperture and the first and second docking apparatus engagement members are configured and positioned to be received by the at least one docking aperture.

18. A system as claimed in claim 17, wherein the at least one docking aperture comprises first and second spaced docking apertures.

19. A system as claimed in claim 17, wherein the at least one docking aperture is asymmetrically shaped.

20. A system as claimed in claim 17, wherein the first and second docking apparatus engagement members include respective docking posts.

21. A system as claimed in claim 11, wherein the alignment component results in the first and second docking apparatus engagement members moving in different directions relative to the docking surface.

22. A system as claimed in claim 11, wherein the docking component results in the first and second docking apparatus engagement members moving in the same direction relative to the docking surface.

23. A docking apparatus for use with a device having first and second device engagement members, the docking apparatus comprising:
   a base member having a base member docking surface; and
   first and second engagement members, at least the first engagement member being movable relative to the base member docking surface between an undock position and a dock position;
   the first and second engagement members respectively defining first and second docking apertures adapted to respectively receive the first and second device engagement members, at least the first docking aperture being shaped such that the first device engagement member is movable between a plurality of positions within the first docking aperture when the first engagement member is in the undock position and is not substantially movable within the first docking aperture when the first engagement member is in the dock position.

24. A docking apparatus as claimed in claim 23, wherein the first and second engagement members are movable between respective undock positions and dock positions.

25. A docking apparatus as claimed in claim 24, wherein the movement of the first and second engagement members between the respective undock positions and dock positions includes an alignment component that results in the first and second engagement members moving in different directions relative to the docking surface and a connecting component that results in the first and second engagement members moving in substantially the same direction relative to the docking surface.

26. A docking apparatus as claimed in claim 25, wherein the second docking aperture is shaped such that the second device engagement member is movable between a plurality of positions within the second docking aperture when the second engagement member is in the undock position and is not substantially movable within the second docking aperture when the second engagement member is in the dock position.

27. A docking apparatus as claimed in claim 23, wherein the first docking aperture is asymmetrical about at least one axis.

28. A docking apparatus as claimed in claim 27, wherein the first docking aperture is symmetrical about at least one axis.

29. A docking apparatus as claimed in claim 23, wherein the first docking aperture is relatively wide near one longitudinal end and relatively narrow near another longitudinal end.

30. A docking apparatus as claimed in claim 29, wherein the second docking aperture is relatively wide near one longitudinal end and relatively narrow near another longitudinal end.

31. A docking apparatus as claimed in claim 23, further comprising:
   an electrical connector associated with the docking surface.

32. A docking apparatus as claimed in claim 31, wherein the electrical connector extends outwardly from the docking surface.

33. A system, comprising:
   a portable information processing device including
      an information processing device electrical connector, and
      at least one information processing device engagement member; and
   a docking apparatus including
      a base member having a base member docking surface,
      a docking apparatus electrical connector associated with the base member docking surface, and
      first and second docking apparatus engagement members movable relative to the base member docking surface between respective undock positions where the electrical connectors are disconnected and dock positions where the electrical connectors are connected;
   wherein one of the at least one information processing device engagement member and the first and second docking apparatus engagement members defines at least one docking aperture and the other of the at least one information processing device engagement member and the first and second docking apparatus engagement members includes a device adapted to be received by the at least one docking aperture; and
   wherein the docking aperture is shaped such that the device is movable between a plurality of positions within the docking aperture when the docking apparatus engagement members are in the undock positions and is not substantially movable within the docking aperture when the docking apparatus engagement members are in the dock positions.

34. A system as claimed in claim 33, wherein the movement of the first and second docking apparatus engagement members between the respective undock positions and dock positions includes an alignment component and a connecting component.

35. A system as claimed in claim 33, wherein the at least one information processing device engagement member comprises first and second docking apertures.

36. A system as claimed in claim 33, wherein the first and second docking apparatus engagement members comprise first and second docking apertures.

37. A method of operating a docking apparatus including a docking surface and docking apparatus electrical connector, the method comprising the steps of:

receiving an information processing device including an information device electrical connector such that the information processing device electrical connector is in spaced relation to the docking apparatus electrical connector and is in one of a plurality of predetermined positions including positions where the docking apparatus electrical connector and the information processing device electrical connector are misaligned;

aligning the information processing device electrical connector with the docking apparatus electrical connector; and connecting the information processing device electrical connector to the docking apparatus electrical connector.

38. A method as claimed in claim 37, wherein the step of receiving the information processing device comprises bringing the information processing device into contact with first and second docking apparatus engagement members, and the step aligning the aligning information processing device electrical connector with the docking apparatus electrical connector comprises moving the first and second docking apparatus engagement members in different directions relative to the docking surface.

39. A method as claimed in claim 38, wherein the step of connecting the information processing device electrical connector to the docking apparatus electrical connector comprises moving the first and second docking apparatus engagement members in substantially the same direction relative to the docking surface.

* * * * *